United States Patent [19]
Hodgson et al.

[11] 3,881,115
[45] Apr. 29, 1975

[54] MULTIPLE QUANTUM LASER

[75] Inventors: Rodney Trevor Hodgson, Somers;
John Robert Lankard, Mahopac;
Peter Pitirinovich Sorokin, White
Plains, all of N.Y.

[73] Assignee: International Business Machines Corporation, Armonk, N.Y.

[22] Filed: Dec. 28, 1973

[21] Appl. No.: 429,413

[52] U.S. Cl.................................. 307/88.3; 330/4.3
[51] Int. Cl. .............................................. H03f 7/04
[58] Field of Search............... 307/88.3; 331/94.5 N; 330/4.3

*Primary Examiner*—Rudolph V. Rolinec
*Assistant Examiner*—Darwin R. Hostetter
*Attorney, Agent, or Firm*—George Baron

[57] ABSTRACT

A double quantum laser employing volatile monoiodides as the active medium and using a combination of stimulated Raman emission and four wave parametric conversion to generate two pulses suitable for triggering the double quantum amplification process.

5 Claims, 3 Drawing Figures

(WITH Nd³⁺ LASER)

(WITH RUBY LASER)

MULTIPLE QUANTUM LASER

BACKGROUND AND BRIEF SUMMARY OF THE INVENTION

A system has been devised for generating two frequencies of intense light from an optically pumped material, the sum of such frequencies being equal to the two photon frequency in that material (See discussion of a multiple quantum laser in U.S. Pat. No. 3,483,486 that issued on Dec. 9, 1969 to P. P. Sorokin). The material chosen for the instant invention is a volatile monoiodide, i.e., $CF_3I$ and $C_2F_7I$ being exemplary. A very powerful laser, emitting at a frequency $\nu_L$, is injected into a quartz cell containing ordinary molecular iodine ($I_2$) vapor and heated to a temperature ~1200°C. at the same time that the iodine vapor is being flash photolyzed to produce ground state iodine atoms. It is to be understood that ground state iodine can be obtained by heating alone, avoiding flash photolysis, if temperatures of 3000°K. or higher can be obtained and tolerated by the container housing the iodine. The frequency $\nu_L$ generates, within the iodine atom-containing cell, an intense stimulated Raman light at a frequency $\nu_S$ and another frequency $\nu_R$, where $\nu_R = \nu_L - 2\nu_S$. Such two frequencies $\nu_S$ and $\nu_R$ enter a volatile moniodide cell wherein the vapor is being photolyzed as the two frequencies enter. The photolyzed monoiodide produces amplified pulses of the two entering pulses $\nu_R$ and $\nu_S$.

DETAILED DESCRIPTION OF THE INVENTION

In the basic patent on double quantum lasing (See U.S. Pat. No. 3,483,486 to P. P. Sorokin), a system was disclosed for producing laser emission so that an active ion could be made to emit two photons when it suffered a transition in a laser cavity between an excited state and an unexcited state. In normal transitions, $E_m - E_t = h\nu$, where $E_m$ is the energy of the excited particle at the excited state $m$ and $E_t$ is the energy of the particle at the unexcited state, $h$ is Planck's constant and $\nu$ is the frequency of the photons emitted during such transitions. In such Sorokin patent, two species of ions A and B were placed in a laser cavity and both were excited to have their respective populations inverted. The inverted population of the B-ions was prevented from lasing by means of a low cavity Q or by a choice of a very long spontaneous lifetime for such B-ions. The cavity had a high Q for the inverted population of A-ions. Should the laser cavity be pumped with an initial intense light pulse of frequency $\nu_A = \nu_B/2$, lasing commences at frequency $\nu_A$ and continues to emit strongly at this frequency, emitting two photons for each transition of a B-ion until the population of the B-ions is reduced to half its original value.

In the present example of a double quantum laser, two frequencies of intense light are generated in a material, the sum of such frequencies adding up to a two photon frequency in that material. The material chosen, namely, excited iodine atoms formed from the photodissociation of $CF_3I$ or $C_2F_5I$ and the like, offers possibilities for enormous energy storage and favorable double quantum selection rules. Instead of the use of two separate ions, as taught in the above noted Sorokin patent, this invention exploits stimulated Raman emission and four wave parametric conversion in atomic iodine gas for achieving double quantum lasing. How the latter is implemented is seen by looking at FIG. 1 in conjunction with FIGS. 2 and 3.

Figure 1:
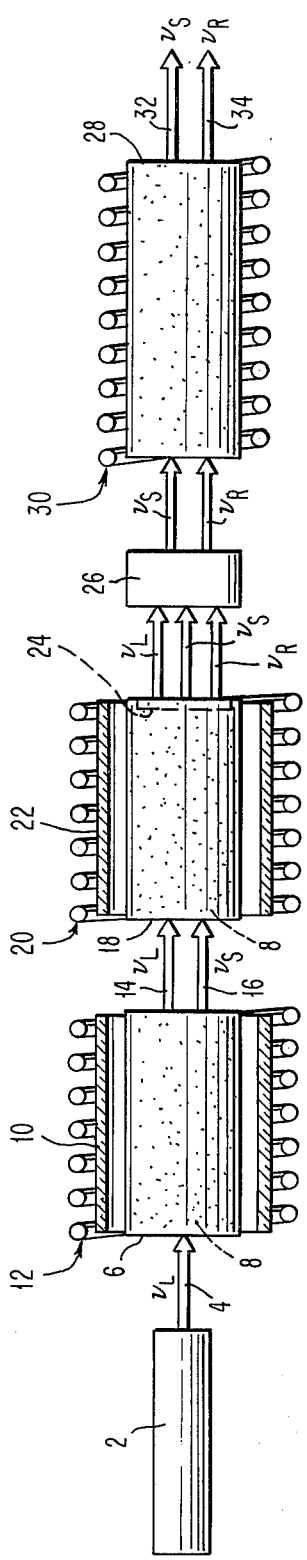
FIG. 1 is a schematic showing of a preferred embodiment of the double quantum laser forming this invention.

In FIG. 1, a laser 2 can be either a ruby or a neodymium glass laser capable of emitting picosecond pulses of one joule or more. The laser 2 will emit a beam 4 of light at its characteristic frequency $\nu_L$, which beam will impinge on a quartz cell 6 containing iodine vapor 8 maintained in the vapor state at a temperature of ~1200°C by a heater not shown. Surrounding such quartz cell 6 is a filter 10 and a xenon lamp 12, substantially concentric with cell 6, said filter 10 passing only those wavelengths of the xenon lamp 12 that are greater than 5000A. The pressure of the $I_2$ vapor is approximately ½ atmosphere and the output of the xenon flash lamp 12 is of the order of 1 kilojoule per microsecond or greater. The role of the flash lamp 12 is to convert or dissociate one molecule of $I_2$ into two iodine atoms in the ground state. A conventional xenon flash lamp 12 lasts approximately 50 microseconds and the iodine molecules remain dissociated for at least 1 millisecond. Consequently, the ruby laser 2 can be turned on anytime within a millisecond after the flash of the lamp 12 has died down.

The ruby beam 4 has a frequency of 14,400 $cm^{-1}$ and it is sufficiently intense to interact with the ground state iodine atoms to cause a stimulated Raman effect so as to produce a Stokes frequency $\nu_S$. For iodine, the excited upper state is 7598 $cm^{-1}$. For the ruby laser-iodine atoms combination, the stimulated Raman emission frequency $\nu_S$ equals the ruby emission $\nu_L$ minus the upper excited state frequency of iodine, or 14,400 $cm^{-1}$ − 7598 $cm^{-1}$. The latter difference is 6802 $cm^{-1}$ and represents the Stokes frequency $\nu_S$. When using a ruby laser, there is a high conversion factor (about 20%) of ruby photons at a frequency of 14,400 $cm^{-1}$ being converted into Stokes photons at a frequency of 6802 $cm^{-1}$.

As a result of the abovenoted dissociation of an iodine molecule into two iodine atoms in the ground state and subsequent pumping of said iodine atoms by an intense ruby beam 4, two beams 14 and 16 emanate from quartz cell 6, beam 14 being the original ruby laser beam of frequency 14,400 $cm^{-1}$ but attenuated by ~20% of its original energy and beam 16 being the Stokes frequency radiation of 6802 $cm^{-1}$. The two beams impinge on a second quartz cell 18 which is transparent to these two frequencies. Iodine molecules are also dissociated into iodine atoms in cell 18, one iodine molecule dissociating into two iodine atoms, but the iodine molecules are maintained in this cell 18 at a pressure of 10 Torr, which is a much lower pressure than that at which the iodine molecules are maintained in cell 8. Additionally, such iodine gas molecules are maintained at about only 100°C. A xenon lamp 20 and a filter 22 are employed to dissociate each iodine molecule in cell 18 into two iodine atoms. If desired, one lamp can be used to serve the same purpose as both lamps 12 and 20 and one filter can be used to serve the same purpose as filters 10 and 22.

Figure 2:
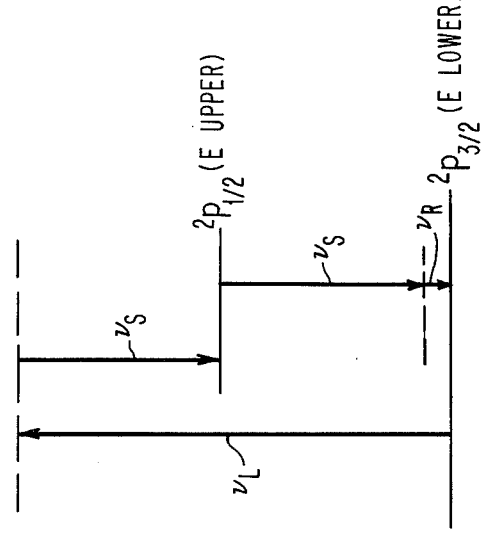
FIG. 2 is an energy level diagram of iodine atoms showing effects of being pumped with the output of a ruby laser.

When the two beams 14 and 16 having, respectively, frequencies $\nu_L$ and $\nu_S$, enter quartz cell 18 having dissociated iodine atoms therein, such frequencies are used for four wave parametric conversion, well known in the art of optics, for example, see "Efficient Parametric Conversion in Cesium Vapor Irradiated by 3470-A° Mode-Locked Pulses" — P. P. Sorokin et al. in the IEEE Journal of Quantum Electronics, Vol. QE 9, No. 2, Feb. 1973, pp. 227–230 and "Tunable Coherent IR Source Based Upon Four-Wave Parametric Conversion in Alkali Metal Vapors" = P. P. Sorokin et al. wherein one photon at a frequency of $\nu_L$ (see FIG. 2) is destroyed so that two photons at a frequency of $\nu_S$ are generated as well as a photon at a frequency of $\nu_R$, wherein $\nu_R = \nu_L - 2\nu_S$. As seen in FIG. 2, the energy sum of the two photons, of frequency $\nu_S$ and another of frequency $\nu_R$, respectively, equals the excited energy state ($P_{1/2}$) of the iodine atom. Thus, the two frequencies $\nu_S$ and $\nu_L$ that enter the left side of cell 18, by a process of efficient four wave parametric conversion, produce another frequency $\nu_R$ that equals $\nu_L - 2\nu_S$. The window 24 of cell 18 permits the passage of all three frequencies $\nu_L$, $\nu_S$ and $\nu_R$.

Adjacent the output window 24 is located a filter 26 for substantially attenuating or blocking out the original ruby laser frequency $\nu_L$ so that only the frequencies $\nu_S$ and $\nu_R$ are available for entry into a third quartz cell 28. The filter 26 can be made of silicon or gaseous iodine. Inside cell 28 is placed a volatile monoiodide, for example, $CF_3I$. This iodide, when pumped with a xenon flash lamp 30, without any filter interposed between the cell 28 and lamp 30, will absorb the 2600 A. frequency of the pumping source 30. The $CF_3I$, maintained at room temperature and at 50 – 200 Torr pressure, will dissociate into $CF_3$ and I* (the excited state $P_{1/2}$ of the iodine atom). In the dissociation of $CF_3I$ to $CF_3 + I^*$, there is unit quantum efficiency, the excited iodine atom is metastable, its radiative transition probability is equal to eight per second and collisions between residual iodide gas atoms and molecules do not quench lasing action. The two frequencies $\nu_S$ and $\nu_R$ stimulate a double quantum transition $\nu_S + \nu_R$. Consequently, an output pulse 32 at frequency $\nu_S$ appears that is an amplification of the input pulse at that frequency and a second output pulse 34, at the frequency $\nu_R$, is an amplification of the input pulse of frequency $\nu_R$.

Figure 3:
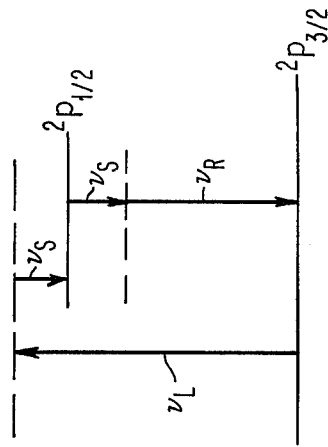
FIG. 3 is an energy level diagram for iodine atoms pumped with the output of a neodymium laser.

FIG. 3 is the energy diagram that explains the double quantum laser operation when the pumping laser 2 is a pulsed neodymium glass laser emitting at a frequency $\nu_L = 9400$ cm$^{-1}$. The Stokes frequency $\nu_S$ that is generated has a frequency of 1802 cm$^{-1}$ in that it is equal to the pump frequency $\nu_L$ (9400 cm$^{-1}$) minus the excited iodine state ($P_{1/2}$) having a frequency of 7598 cm$^{-1}$. The double quantum amplified pulses $\nu_S$ and $\nu_R$ of the combined iodine - neodymium laser combination will have respective frequencies of $\nu_S = 1802$ cm$^{-1}$ and $\nu_R = 5796$ cm$^{-1}$.

While FIG. 1 represents a preferred embodiment of the invention shown and described herein, the main thrust of the invention is to create two intense frequencies $\nu_1$ and $\nu_2$ such that $h\nu_1 + h\nu_2 = E$, where E is the energy of the material from its ground state to its excited state. An alternate way of practicing the invention is the employment of two independent stimulated Raman scatterers to achieve such frequencies. This invention is not precluded from using other techniques for achieving such two frequencies.

What is claimed is:

1. A system for generating stimulated two photon emission comprising volatile monoiodides in a transparent container, flash photolysis means directed at said volatile monoiodides for achieving large inversions in atomic iodine to an excited state, and means for generating two intense synchronous pulses $\nu_1$ and $\nu_2$ such that $h\nu_1$ and $h\nu_2$ equals the energy of the excited iodine atoms.

2. A system for generating stimulated two photon emission comprising atomic iodine in a transparent container, an intense laser pulse of first frequency $\nu_L$ directed at said atomic iodine to achieve by stimulated Raman scattering a second frequency $\nu_S$ appearing with said first frequency $\nu_L$, a second transparent container of atomic iodine excited by said frequencies $\nu_S$ and $\nu_L$ so as to produce by four wave parametric conversion a third frequency $\nu_R$ of light whereby $\nu_R = \nu_L - 2\nu_S$, means for filtering out $\nu_L$ but transmitting $\nu_S$ and $\nu_R$, and means for amplifying said frequencies $\nu_S$ and $\nu_R$ comprising flash photolysis of a volatile monoiodide.

3. A system for achieving two stimulated emission pulses due to a double quantum transition comprising a laser emitting an intense beam at a frequency $\nu_L$, iodine vapor in a cell that is excited by said beam of frequency $\nu_L$, means for dissociating most molecules of said iodine vapor into iodine atoms while said vapor is excited by said laser beam so as to produce a Stokes frequency $\nu_S$ equal to the frequency $\nu_L$ minus the frequency of the excited state of said iodine atoms, a second cell in the path of said two frequencies $\nu_L$ and $\nu_S$ and containing iodine molecules each of which has been dissociated into two iodine atoms, the interaction of said two frequencies with said iodine atoms producing a third frequency $\nu_R$ such that $\nu_R = \nu_L - 2\nu_S$, which frequencies appear simultaneously as outputs from said second cell, means for filtering out the frequency $\nu_L$ so that only the frequencies $\nu_S$ and $\nu_R$ remain, and a third cell containing excited iodine atoms in the path of said two frequencies $\nu_S$ and $\nu_R$ so as to produce amplified output signals corresponding to frequencies $\nu_S$ and $\nu_R$.

4. The system of claim 3 wherein said laser is a ruby laser.

5. The system of claim 3 wherein said laser is a neodymium glass laser.

* * * * *